(12) United States Patent
Li

(10) Patent No.: US 7,215,681 B2
(45) Date of Patent: May 8, 2007

(54) ADAPTIVE CHANNEL ACCESS FOR CARRIER SENSE MULTIPLE ACCESS BASED SYSTEMS

(75) Inventor: Chris Cho-Pin Li, New York, NY (US)

(73) Assignee: ITT Manufacturing Enterprises Inc., Wilmington, DE (US)

(*) Notice: Subject to any disclaimer, the term of this patent is extended or adjusted under 35 U.S.C. 154(b) by 1072 days.

(21) Appl. No.: 10/241,046

(22) Filed: Sep. 11, 2002

(65) Prior Publication Data

US 2004/0047314 A1 Mar. 11, 2004

(51) Int. Cl.
*H04L 12/413* (2006.01)
*H04J 3/16* (2006.01)

(52) U.S. Cl. .................................. 370/445; 370/465

(58) Field of Classification Search ................ 370/431, 370/445, 458, 461–462, 465, 468
See application file for complete search history.

(56) References Cited

U.S. PATENT DOCUMENTS

| | | | |
|---|---|---|---|
| 4,628,311 A | 12/1986 | Milling | |
| 4,987,571 A | 1/1991 | Haymond et al. | |
| 5,164,942 A | 11/1992 | Kamerman et al. | |
| 5,369,639 A | 11/1994 | Kamerman et al. | |
| 5,515,035 A | 5/1996 | Gut | |
| 5,526,355 A | 6/1996 | Yang et al. | |
| 5,553,316 A | 9/1996 | Diepstraten et al. | |
| 5,812,766 A | 9/1998 | Osawa | |
| 5,987,033 A | 11/1999 | Boer et al. | |
| 6,343,071 B1 | 1/2002 | Lansford | |
| 6,529,520 B1 * | 3/2003 | Lee et al. | 370/442 |

| 2001/0055312 A1 | 12/2001 | Negus |
|---|---|---|

FOREIGN PATENT DOCUMENTS

| EP | 0 475 681 A2 | 3/1992 |
|---|---|---|
| EP | 0 475 681 A3 | 3/1992 |
| EP | 0 475 681 B1 | 3/1992 |
| EP | 0 475 682 A2 | 3/1992 |
| EP | 0 475 682 B1 | 3/1992 |
| EP | 0 549 235 A1 | 6/1993 |
| EP | 0 549 235 B1 | 6/1993 |
| EP | 0 632 619 A2 | 1/1995 |
| EP | 0 632 619 A3 | 1/1995 |
| EP | 0 901 252 A2 | 3/1999 |
| EP | 0 901 252 A3 | 3/1999 |
| WO | WO 00/18041 | 3/2000 |
| WO | WO 01/33739 A1 | 5/2001 |
| WO | WO 01/78426 A1 | 10/2001 |

OTHER PUBLICATIONS

"Wireless LAN Medium Access Control (MAC) and Physical Layer (PHY) Specifications", ANS/IEEE, Std 802.11, 1999, pp. 75-76.

* cited by examiner

*Primary Examiner*—Kevin C. Harper
(74) *Attorney, Agent, or Firm*—RatnerPrestia

(57) ABSTRACT

In a network including multiple nodes communicating on a channel using CSMA protocol, where each node accesses the channel by occupying at least one time slot in a contention interval, the invention includes transmitting and receiving, in a node, messages on the channel during a first time interval. The invention counts, in the node, at least one of the transmitted and received messages during the first time interval. The invention determines, in the node, a channel occupancy during the first time interval, after counting the messages, and then adaptively adjusts, in the node, the contention interval based on the channel occupancy.

19 Claims, 4 Drawing Sheets

ADAPTIVE CHANNEL ACCESS FOR CARRIER SENSE MULTIPLE ACCESS BASED SYSTEMS

TECHNICAL FIELD

The present invention relates, in general, to network communications using carrier sense multiple access (CSMA). More specifically, the present invention relates to a method of controlling access rate to a CSMA communications channel by adaptively adjusting a time length of a contention interval (CI).

BACKGROUND OF THE INVENTION

Nodes in a CSMA network do not have a priority sequence for communicating with each other. Instead, any node may transmit at any time with the same priority as any other node in the network. Since nodes may attempt to transmit packets at the same time, the packets may interfere with each other, resulting in collisions. As nodes attempt a retransmission, after detecting a collision, system load in the network is typically increased.

Each node using CSMA protocol measures time from a last activity on a shared channel in equal time slots of a contention interval. A transmitting node in the network generates a random number, then counts a corresponding number of time slots until the random number is reached. At that point, the node may attempt to occupy the channel and other nodes may suspend their count until the channel is free again. If two nodes generate the same random number, by chance, and consequently collide, each then may generate a new random number and start counting time slots from zero in the next contention interval.

In a CSMA based network, nodes sense the channel before transmitting a data packet to another node. In a CSMA with collision detection (CSMA/CD) based network, nodes detect collision before transmitting, and stop transmitting if noise is sensed in the channel. In a CSMA with collision avoidance (CSMA/CA) based network, nodes listen to any activity and reserve a space in the channel to avoid collision.

To reduce the occurrence of collisions in networks, channel reservation may be deployed. Typically, reservation involves two-way communications between a transmitting node and a receiving node. When a data packet arrives from an upper layer (for example an Internet communications application), the transmitting node first reserves channel space for the transmission of the data packet. If the transmitting node detects that channel space is available, the node schedules transmission of a request-to-send (RTS) packet to a receiving node, after a generated random interval is reached. In doing so, the transmitting node informs the receiving node of the pending data packet and allows the receiving node to determine if the transmitting node may transmit the data packet over the available channel space. If the receiving node senses that channel space is available, a clear-to-send (CTS) packet is returned to the transmitting node and the channel space is reserved. After receiving the CTS packet, the transmitting node transmits the data packet over the reserved channel. By allowing the receiving node to determine whether the transmitting node may transmit the data packet, the probability of collision due to hidden nodes is reduced. In addition, collisions of multiple RTS packets, simultaneously transmitted over the channel by neighboring nodes, may also be reduced.

In general, the random delay, in number of time slots of a contention interval, is uniformly selected from a range of one time slot up to a maximum number of time slots in the contention interval, where the length of the contention interval is predetermined.

Because access rate of a node is fixed by the initial predetermined CI length, channel access rate (CAR) in the network cannot be adjusted, when more nodes than initially expected start to content for limited channel resources. In an IEEE 802.11 protocol standard, the CI length may be temporarily lengthened to lessen channel congestion at the expense of higher channel access rate. IEEE 802.11 protocol resets the CI length to its initial predetermined value, after a channel access attempt is successful. Knowledge of a prior successful channel access is not utilized in a subsequent channel access attempt. As a result, performance of the IEEE 802.11 protocol is limited.

What is needed is a system and method of controlling the CAR in a communications network by adaptively adjusting the length of the CI based on previous knowledge of traffic conditions or channel occupancy conditions in the network. This invention addresses this need.

SUMMARY OF INVENTION

To meet this and other needs, and in view of its purpose, the present invention provides a system and method of adaptively adjusting the length of a contention interval (CI) used for accessing a communications channel in a carrier sense multiple access (CSMA) based network.

In a network including multiple nodes communicating on a channel using CSMA protocol, where each node accesses the channel by occupying at least one time slot in a contention interval, an exemplary method of the invention includes transmitting and receiving, in a node, messages on the channel during a first time interval. The method counts, in the node, at least one of the transmitted and received messages during the first time interval. The method determines, in the node, a channel occupancy during the first time interval, after counting the messages, and then adaptively adjusts, in the node, the contention interval based on the channel occupancy.

In another embodiment of the invention, a node, communicating on a channel in a network using CSMA protocol and accessing the channel by occupying at least one time slot in a contention interval, includes a transceiver for transmitting and receiving messages on the channel. The node also includes a counter, coupled to the transceiver, for counting the messages transmitted and received by the transceiver and providing output count values. The node further includes a controller, coupled to the counter, for (a) receiving the count values, (b) determining a channel occupancy based on the count values, and (c) adaptively adjusting the contention interval based on the channel occupancy.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

The present invention controls CAR in a CSMA based communications system by adaptively adjusting a length of a contention interval (CI). As will be explained, the invention monitors messages or packets in the channel, determines occupancy conditions of the channel, and adaptively adjusts the length of the CI based on the determined occupancy conditions.

Figure 1:
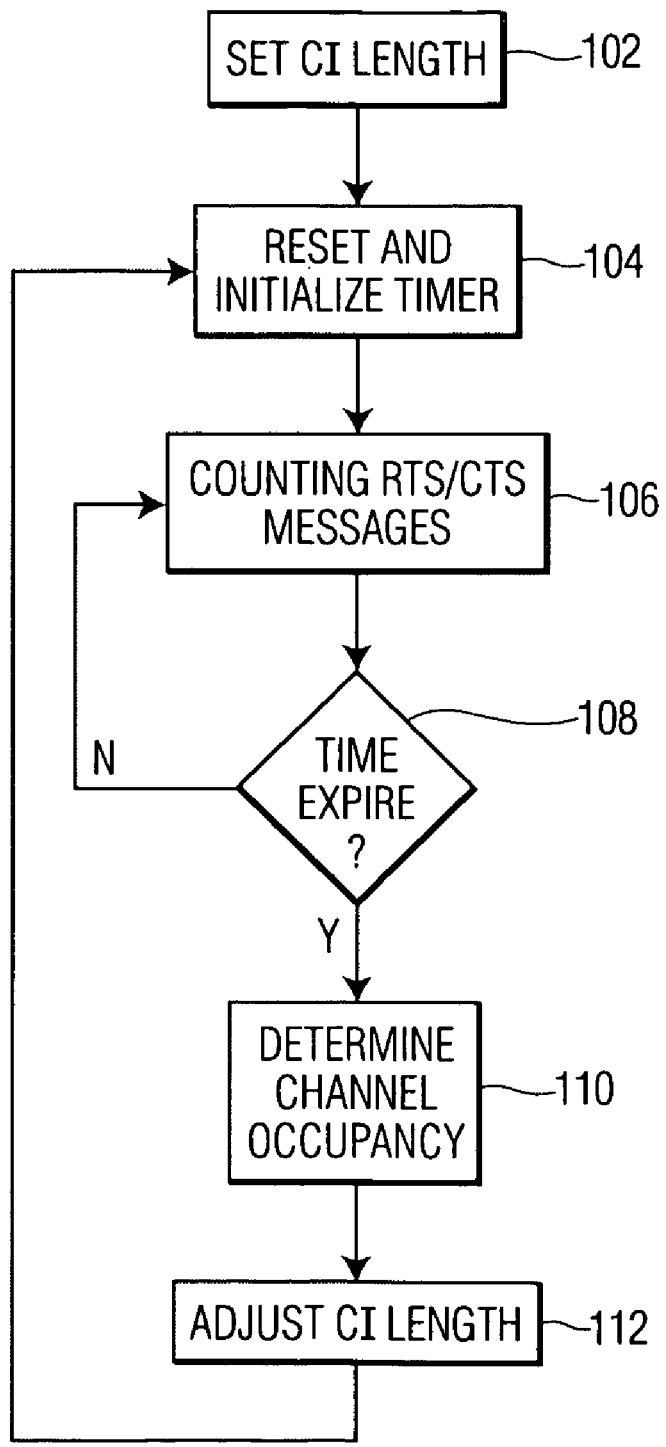
FIG. 1 is a flow diagram of a method for adaptively adjusting the length of a CI in a CSMA based communications system, in accordance with an embodiment of the present invention.

Referring to FIG. 1, there is shown a method of adaptively adjusting the CI length, generally designated as 100, in accordance with an embodiment of the invention. As will be explained, the probability of a node successfully transmitting a data packet is calculated and the CI length is adaptively adjusted accordingly. Method 100 starts at step 102 by setting an initial CI length in time slots, and in step 104 by resetting and initializing a timer. Method 100 then enters step 106 and counts messages or packets received and transmitted in the channel. The messages counted may include RTS and CTS packets occurring in the channel (also referred to as RTS and CTS events). A RTS packet may include a point-to-point RTS packet or a broadcast RTS packet. A CTS packet may include a singular CTS packet or a point-to-point CTS packet.

The count is performed over a predetermined interval of time. In step 108, the method determines whether the time interval expired. If the time interval has not expired, the method continues the counting step, by branching back to step 106. When the count interval expires, method 100 branches to step 110 and determines channel occupancy, or available channel space. As will also be explained, channel occupancy or available channel space is based on the counter values. The resulting channel occupancy or available channel space is then used to compute the probability of a node successfully transmitting a data packet.

The computed estimate is used as a basis for adaptively adjusting the CI length of the channel, as performed by step 112. The CI length may be increased or decreased in step 112 by an integer number of time slots. After adjusting the CI length, the method loops back to step 104 and begins another counting cycle for computing a next CI length.

Figure 2:
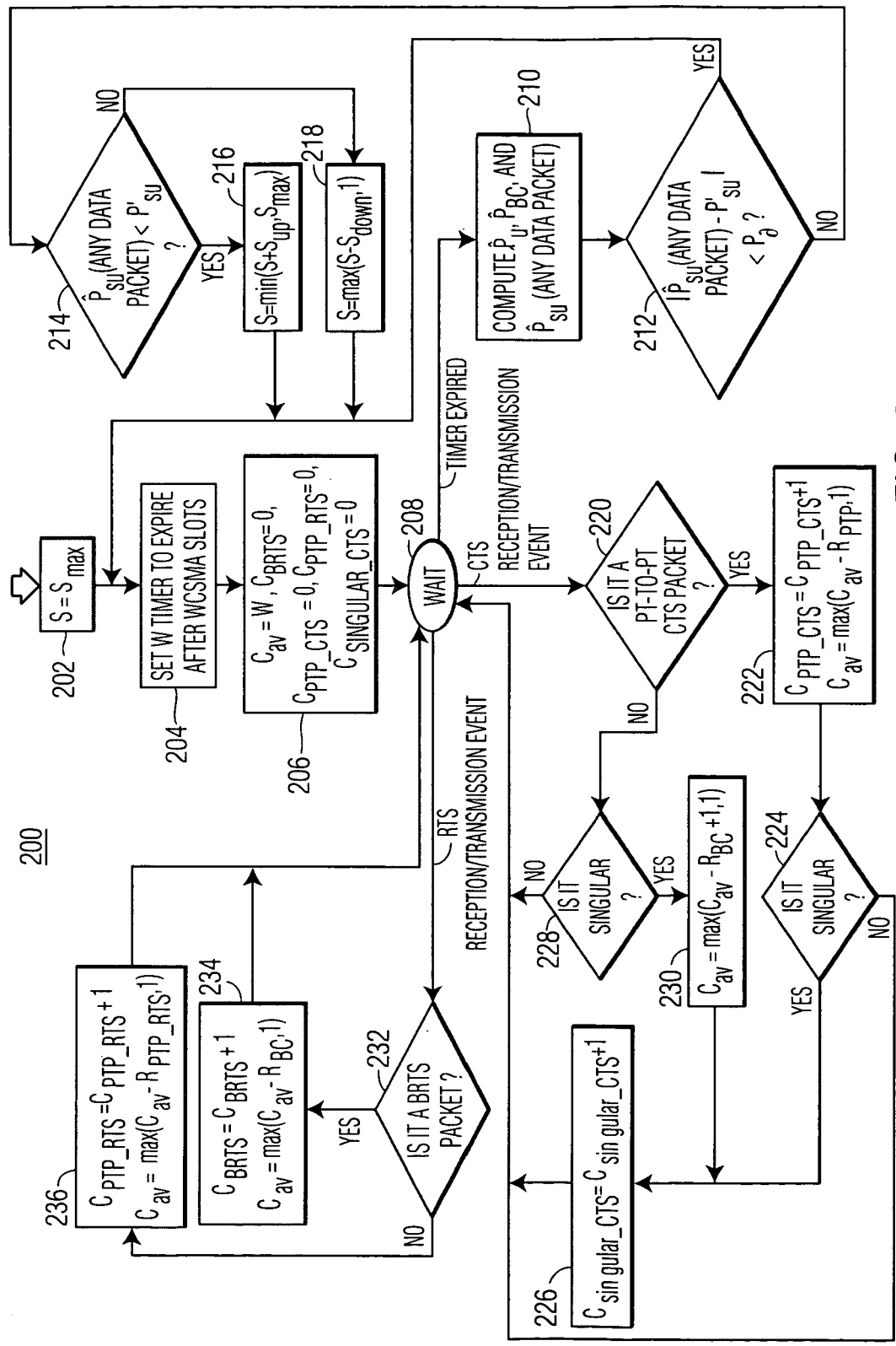
FIG. 2 is a flow diagram of another exemplary method for adaptively adjusting the length of a CI in a CSMA based communications system, in accordance with an embodiment of the present invention.

Referring next to FIG. 2, there is shown a detailed flow diagram of a method of adaptively adjusting the length of the CI in a CSMA channel, in accordance with an embodiment of the invention. The method, generally designated as 200, begins at step 202 and sets $S=S_{max}$, where S is a CI length in number of CSMA contention slots used by a communications node and $S_{max}$ is a predetermined maximum CI length (for example $S_{max}$ may be 12, 20, etc. time slots). The method then enters step 204 and sets a timer to expire after W time slots. The timer is initialized and various counters, as shown in step 206, are each initialized to a value of zero (these counters are discussed below).

Step 208 is entered next to allow the method to count RTS reception and transmission events (steps 232, 234 and 236), as further discussed below. Step 208 is also entered to allow the method to count CTS reception and transmission events (steps 220, 222, 224, 226, 228 and 230), as further discussed below. Step 208 allows the method to concurrently count these events until the timer expires. When the timer expires after W time slots, the method exits step 208 and branches to step 210 for computing $\hat{P}_{su}$, which is an estimate of a probability (denoted as $P_{su}(*)$) of a local node successfully reserving channel space to transmit a data packet, as further discussed below. The estimate of $\hat{P}_{su}$ may be computed once every interval of W time slots (a default value may be W=1000 time slots).

After the estimate of probability is computed, the method enters step 212 and compares the difference between the estimate of $\hat{P}_{su}$ and a configurable performance level of $P'_{su}$ (for example 95%) with a delta value of $\hat{P}_{\partial}$. This delta value may also be configurable value and may include, for example, a default value of 1%. If the difference between the absolute value of $\hat{P}_{su}$ and $P'_{su}$ is less than $P_{\partial}$, as determined by step 212, the method loops back to step 204 without making any adjustment to the CI length. If the method in step 212, on the other hand, determines that the difference is greater than or equal to $P_{\partial}$, the method branches to step 214.

If step 214 determines that $\hat{P}_{su}$ is smaller than $P'_{su}$, the method branches to step 216 and increases the length of CI by a value of $S_{up}$. It will be appreciated that $S_{up}$ may be a configurable value having a default value of 2 time slots. If step 214, on the other hand, determines that $\hat{P}_{su}$ is greater than or equal to $P'_{su}$, the method branches to step 218 and decreases the length of CI by a value of $S_{down}$. It will be appreciated that $S_{down}$ may be a configurable value having a default value of 1 time slot.

It will be further appreciated that the $P'_{su}$ value is a threshold value utilized by the invention to represent a channel access performance level that a user of a communications node desires to maintain. The adaptation rate of the node is determined by the protocol window size (W), the CI length increment ($S_{up}$), and the CI length decrement ($S_{down}$). In general, a faster adaptation rate may be achieved with a smaller protocol window size, and/or a larger CI length increment or decrement step.

In one embodiment, the protocol window size (W) is set larger than 1000 time slots, so that a sufficient number of samples may be collected for the computation of $\hat{P}_{su}$. In other embodiments, the protocol window size (W), the CI length increment ($S_{up}$), and the CI length decrement ($S_{down}$) may be set to other values to achieve better system performance.

The computation of $\hat{P}_{su}$ (any data packet) depends on a specific implementation of CSMA protocol used by the communications network. An exemplary method of computing $\hat{P}_{su}$ (any data packet) will now be described and is based on nodes in a network operating using Small Unit Operation (SUO) radios, manufactured by ITT. The invention, however, is not limited to protocols used by the SUO radios.

First, let $P_{BC}$ be the probability that any packet received by a media access controller (MAC) in a local node (304 in FIG. 3), or one of the local node's neighbors, is a broadcast packet (i.e. local traffic profile). Then $\hat{P}_{su}$ may be defined by the following equation:

$$P_{su}(\text{any data packet}) = P_{BC} \cdot P_{su}(\text{broadcast packet}) + (1 - P_{BC}) \cdot P_{su}(\text{pt-to-pt packet}) \quad (1)$$

Let $P_u$ be the probability of a given CSMA time slot being used by the local node and/or at least one of the local node's neighbors, then $$P_{su}(\text{broadcast packet}) = 1 - P_u \quad (2)$$

$$P_{su}(\text{pt-to-pt packet}) = (1 - P_u) \cdot \sum_{i=0}^{N-1} P_u^i \quad (3)$$

where N is the maximum allowed number of tries for pt-to-pt (point-to-point) packet transmissions.

When Eqs.(2) and (3) are substituted into Eq.(1), $\hat{P}_{su}$ may be computed by the following equation:

$$P_{su}(\text{any data packet}) = P_{BC} \cdot (1 - P_u) + (1 - P_{BC}) \cdot (1 - P_u) \cdot \sum_{i=0}^{N-1} P_u^i \quad (4)$$

Simplifying Eq.(4) yields $$P_{su}(\text{any data packet}) = (1 - P_u) \cdot \left(1 + (1 - P_{BC}) \sum_{i=1}^{N-1} P_u^i\right) \quad (5)$$

Let $\hat{P}_{BC}$, and $\hat{P}_u$ be the estimates of $P_{BC}$, and $P_u$, respectively. Eq.(5) may be rewritten as follows:

$$\hat{P}_{su}(\text{any data packet}) \cong (1 - \hat{P}_u) \cdot \left(1 + (1 - \hat{P}_{BC}) \sum_{i=1}^{N-1} \hat{P}_u^i\right) \quad (6)$$

$\hat{P}_{BC}$ may be approximated by the follow equation:

$$\hat{P}_{BC} \cong \frac{C_{BRTS}}{C_{BRTS} + C_{PTP\_CTS}} \quad (7)$$

where $C_{BRTS}$ and $C_{PTP\_CTS}$ are the total number of received/transmitted broadcast RTS (BRTS) and pt-to-pt CTS packets, respectively, during a W window size.

Let $C_{av}$, $C_{PTP\_RTS}$, and $C_{singular\_CTS}$ be the available space (in number of time slots) for CSMA contention, the total number of received/transmitted pt-to-pt RTS packets, and the total number of received singular CTS packets, respectively, during a W window size, then $\hat{P}_u$ may be approximated by the following equation:

$$\hat{P}_u \cong \min\left(\frac{C_{BRTS} + C_{PTP\_RTS} + C_{singular\_CTS}}{C_{av}}, 1\right) \quad (8)$$

It will be appreciated that the estimate for $\hat{P}_u$ is limited to 100 percent (certainty) by the value of 1, shown in Eq. (8). It will also be appreciated that a singular CTS packet includes a CTS packet that is not preceded by a corresponding RTS packet.

Let $L_{BC}$ and $L_{PTP}$ be the data message length (in number of time slots), indicated in the received/transmitted broadcast RTS and pt-to-pt CTS packets, respectively.

Let $R_{BC}$ be a restricted back-off time interval (in number of time slots) for CSMA channel contention, when a broadcast RTS is received/transmitted. Also, let $R_{PTP}$ and $R_{PTP\_RTS}$ be similar back-off time intervals for the reception/transmission of pt-to-pt CTS and pt-to-pt RTS packets, respectively.

In the exemplary embodiment, only one broadcast channel is used. The restricted back-off time interval for the broadcast channel may be computed, as shown in Eq (9), depending on whether an acknowledgement (ACK) is requested or not requested:

$$R_{BC} = \begin{cases} L_{BC} + 1 & \text{if } ACK_{BC} \text{ isn't requested} \\ L_{BC} + 2 & \text{if } ACK_{BC} \text{ is requested} \end{cases} \quad (9)$$

In the exemplary embodiment, one or more data channels may be allocated for pt-to-pt message transmissions. As a result, the restricted back-off time interval for pt-to-pt message transmissions, namely $R_{PTP}$, is equal to 0 if the channel reservation initiated by the received/transmitted pt-to-pt CTS packet does not exhaust all pt-to-pt channel resources, or may have the following value:

$2 \leq R_{PTP} \leq L_{PTP} + 1$, if the channel reservation exhausts all the pt-to-pt channel resources.

In other embodiments having only one data channel allocated for pt-to-pt message transmissions, or only one data channel allocated for both broadcast and pt-to-pt message transmissions, the restricted back-off time interval for pt-to-pt message transmissions may be computed as follows:

$$R_{PTP} = L_{PTP} + 1 \quad (10)$$

In the exemplary embodiment, a CSMA time slot is reserved following the transmission/reception of a pt-to-pt RTS packet for a probable transmission of a responding pt-to-pt CTS packet. As a result, $R_{PTP\_RTS}$ may be specified as follows:

$$R_{PTP\_RTS} = 1 \quad (11)$$

Referring flow again to FIG. 2, the method in step 206 initializes counters $C_{av}$, $C_{PTP\_RTS}$, $C_{singular\_CTS}$, $C_{BRTS}$ and $C_{PTP\_CTS}$ at the start of the timer interval, as follows:

$C_{av} = W$, $C_{BRTS} = 0$, $C_{PTP\_CTS} = 0$, $C_{PTP\_RTS} = 0$, and $C_{singular\_CTS} = 0$ The method next waits for the W time interval to expire or for a RTS/CTS reception/transmission event to occur. If a CTS reception/transmission event occurs, the method branches to step 220 and determines whether the event includes a point-to-point packet or a broadcast packet. If it is a point-to-point CTS packet, the method branches to step 222, increases $C_{PTP\_CTS}$ by one time slot and decreases $C_{av}$ by $R_{PTP}$ (the back-off time interval). These counters are modified as follows:

$C_{PTP\_CTS} = C_{PTP\_CTS} + 1$ $C_{av} = \max(C_{av} - R_{PTP}, 1)$, where a minimum time slot may be 1.

The method then branches to step 224 to determine whether the pt-to-pt CTS packet is a singular CTS packet. If the pt-to-pt CTS packet is singular, the method branches to step 226 and increases $C_{singular\_CTS}$ by one, as follows:

$C_{singular\_CTS} = C_{singluar\_CTS} + 1$

After increasing this counter by one time slot, the method loops back to step 208.

If step 220 determines that the packet is not a pt-to-pt CTS packet, on the other hand (i.e. it is a broadcast CTS packet), the method branches to step 228 to check whether the broadcast CTS packet is a singular CTS packet. If it is singular, the method branches to step 230 and decreases $C_{av}$ by ($R_{BC}$−1) time slots, wherein $R_{BC}$ is the back-off time interval (in number of time slots) for CSMA channel contention when a broadcast RTS is received/transmitted. This expression may be written as follows:

$C_{av}=\max(C_{av}-R_{BC}+1,1))$.

The method next branches to step 226 and increases $C_{singlar\_CTS}$ by one time slot, as follows:

$C_{singular\_CTS}=C_{singular\_CTS}+1$

If the method determines, in either steps 224 or 228, that the CTS packet is not singular, the method loops back to step 208, as shown.

Continuing the description of method 200, if the reception/transmission event indicates a RTS packet, the method branches to step 232 and determines whether the RTS packet is a broadcast packet. If it is a broadcast packet, the method branches to step 234, increases $C_{BRTS}$ by one time slot and decreases $C_{av}$ by $R_{BC}$, the back-off time interval (in number of time slots). The counters are modified as follows:

$C_{BRTS}=B_{BRTS}+1$ $C_{av}=\max(C_{av}-R_{BC},1)$

If the RTS packet is not a broadcast packet, on the other hand (i.e. it is a pt-to-pt packet), the method branches to step 236, increases $C_{PTP\_RTS}$ by one time slot and decreases $C_{av}$ by $R_{PTP\_RIS}$, the back-off time interval (in number of time slots). The counters are modified as follows:

$C_{PTP\_RTS}=C_{PTP\_RTS}+1$ $C_{av}=\max(C_{av}-R_{PTP\_RTS},1)$

Method 200 then loops back to step 208 and either waits for the timer to expire or for another reception/transmission event to occur.

After the timer expires, the method enters step 210 and computes $\hat{P}_{BC}$, $\hat{P}_u$ and $\hat{P}_{su}$ (any data packet) using equations (6), (7) and (8), as Previously desired performance threshold value (steps 212 and 214), as previously described. Finally, the method loops back to step 204 and begins the process again by setting the timer and initializing the counters.

Figure 3:
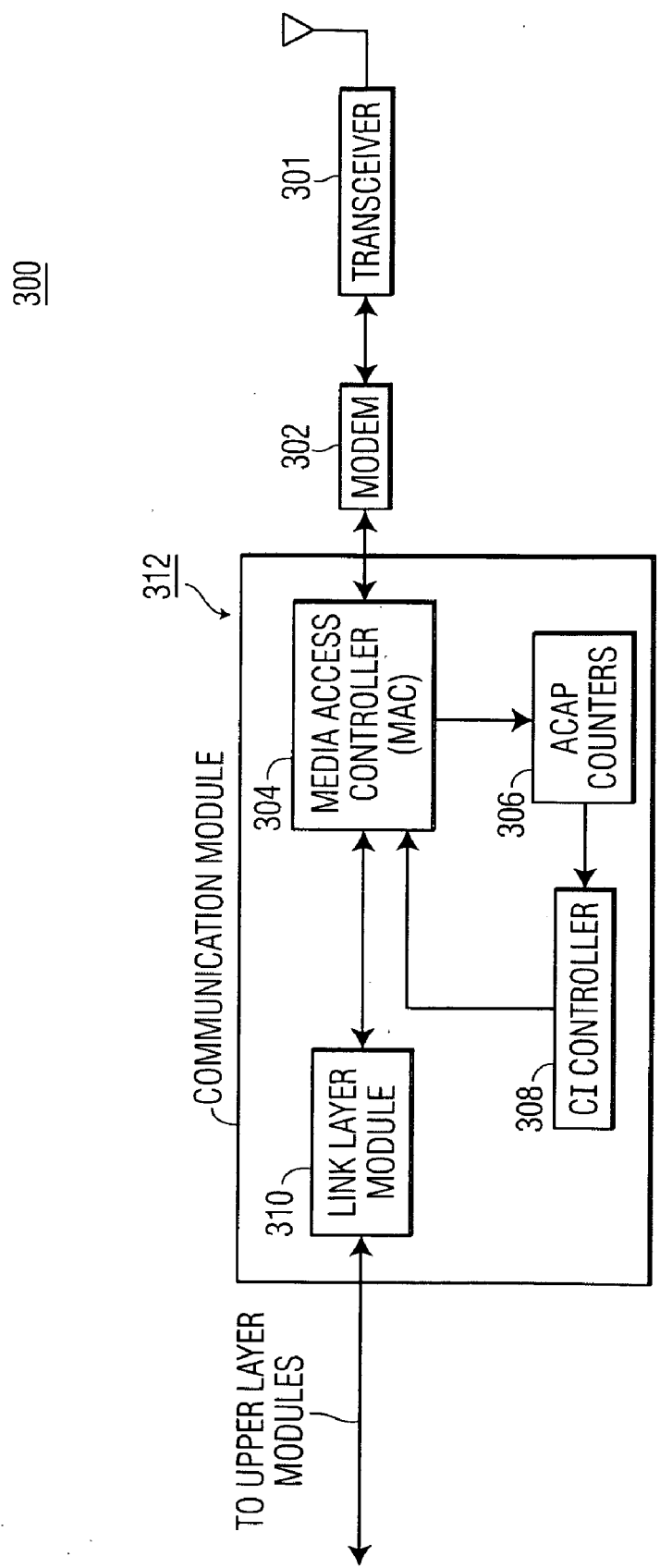
FIG. 3 is a block diagram of a node including a communications module for executing the methods illustrated in FIGS. 1 and 2, in accordance with an embodiment of the present invention.

Referring next to FIG. 3, there is shown a block diagram of node 300 executing the methods illustrated in FIGS. 1 and 2, in accordance with an embodiment of the present invention. As shown, the node includes transceiver 301 for transmitting and receiving packets to/from other nodes or neighbors in the communications network, modem 302, and communications module 312. Module 312 includes media access controller (MAC) 304, adaptive channel access protocol (ACAP) counters 306, CI controller 308 and link layer module 310. Although not shown, it will be appreciated that the link layer module provides a communications interface between the MAC and other higher level modules. For example, in an OSI (open system interconnect) environment, the MAC and the link layer module may control reception/transmission of packets received/transmitted between modem 302 and other upper layer modules (not shown) that provide application software for appliances or computers invoking different protocols. On the link layer side, these protocols may include a high level data link control (HDLC) protocol, a point to point protocol (PPP), or an application program interface (API) protocol. On the other MAC side, the protocol may include protocols such as carrier sense multiple access with collision detection (CSMA/CD) or carrier sense multiple access with collision avoidance (CSMA/CA).

For the embodiment shown in FIG. 1, ACAP counters 306 may provide counters for counting RTS/CTS packets or messages during a predetermined time interval. For the embodiment shown in FIG. 2, ACAP counters 306 may include $C_{av}$, $C_{PTP\_RTS}$, $C_{singular\_CTS}$, $C_{BRTS}$ and $C_{PTP\_CTS}$, and may count during a W time interval, as described previously. In response to the counts of ACAP counters 306, CI controller 308 adaptively adjusts the length of CI based on channel occupancy or computed probability functions, as described previously. MAC 304 may then use each newly adjusted CI length to adaptively control channel access in the CSMA communications network.

Figure 4:
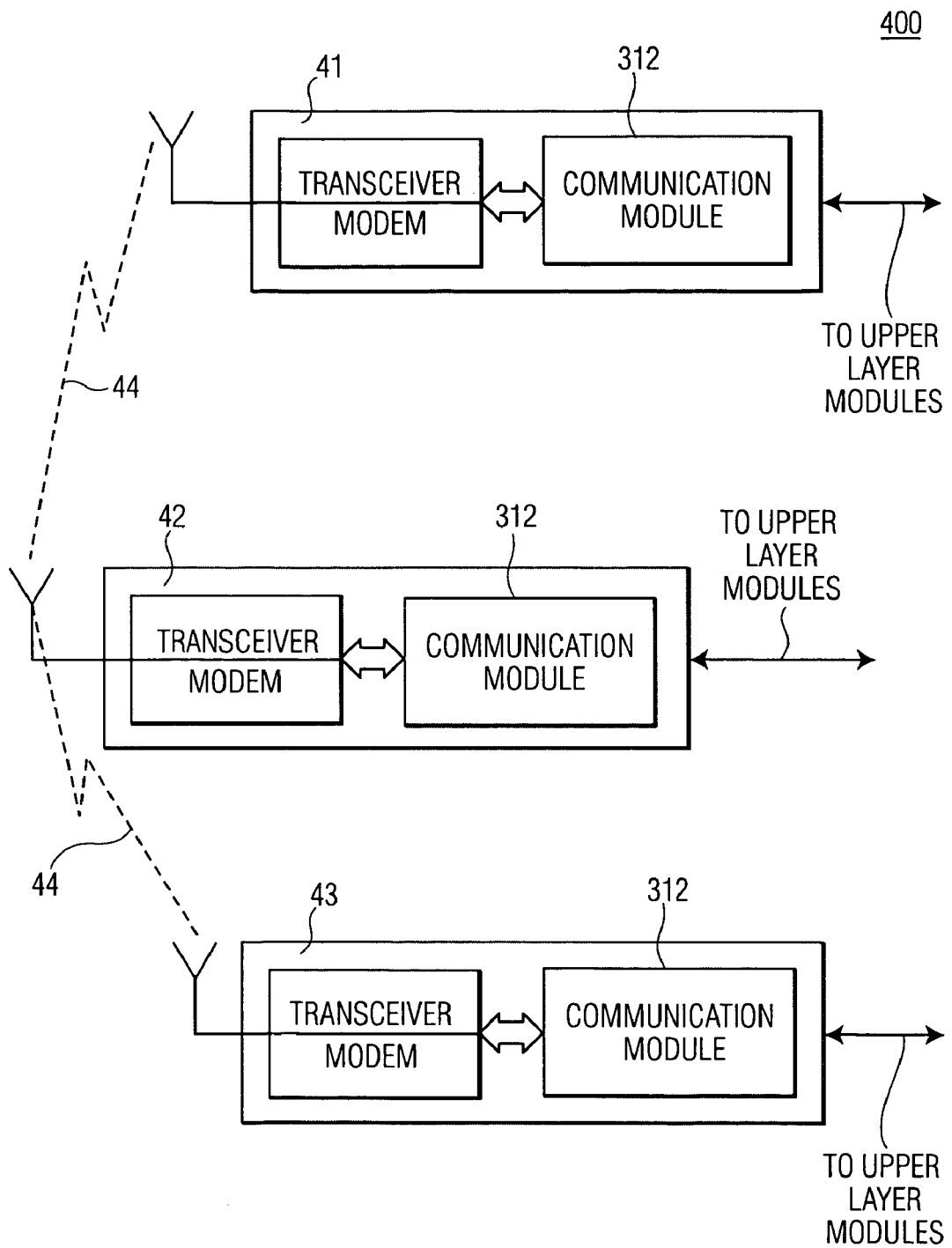
FIG. 4 is an overall block diagram showing multiple nodes communicating in a CSMA based communications system, in accordance with an embodiment of the present invention.

Referring to FIG. 4, there is shown an overall block diagram of multiple nodes communicating in a network. The network, generally designated as 400, includes nodes 41, 42 and 43, each including communications module 312. The system includes at least one common communications channel 44 for transmitting and receiving message on the channel.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention. For example, the present invention may adaptively adjust a CI of a channel in a CSMA/CA or CSMA/CD communications based network. It will be also be appreciated that the present invention may be implemented in both wireless and wired network systems.

What is claimed:

1. In a network including multiple nodes communicating on a communications channel using a carrier sense multiple access (CSMA) protocol, each node accessing the channel by occupying at least one time slot in a contention interval, a method of reducing data collision on the channel comprising the steps of:
   (a) transmitting and receiving, in a node, messages on the communications channel in the network during a first time interval;
   (b) counting, in the node, at least one of the transmitted and received messages in step (a) during the first time interval;
   (c) determining, in the node, a channel occupancy during the first time interval after counting in step (b); and
   (d) adaptively adjusting, in the node, the contention interval based on the channel occupancy determined in step (c);
   wherein step (d) includes adaptively adjusting the contention interval, designated by S and having a predetermined maximum value of Smax, according to the following expressions:

$S=\min(S+S_{up},S_{max})$ $S=\max(S-S_{down},1)$ wherein Sup is a first integer value and Sdown is a second integer value.

2. The method of claim 1 wherein
   step (c) includes estimating probability of successful transmission of a message on the channel during a second time interval, wherein the second time interval follows the first time interval, and step (d) includes adaptively adjusting the contention interval for the second time interval.

3. The method of claim 2 wherein the first time interval is substantially similar to the second time interval.

4. The method of claim 1 wherein
step (d) includes increasing the contention interval by a first number of time slots, if the channel occupancy is higher than a first predetermined value, and
decreasing the contention interval by a second number of time slots, if the channel occupancy is lower than a second predetermined value.

5. The method of claim 4 wherein the first predetermined value is higher than the second predetermined value.

6. The method of claim 4 wherein step (c) includes maintaining the contention interval free-of change, if the channel occupancy includes a value between the first predetermined value and the second predetermined value.

7. The method of claim 1 including the step of:
(e) reserving, in the node, the channel based on a randomly generated number, after adaptively adjusting the contention interval in step (d).

8. The method of claim 1 wherein
step (a) includes receiving, in the node, a request to send (RTS) packet and transmitting, from the node, a clear to send (CTS) packet, during the first time interval; and
step (b) includes counting the RTS packet and the CTS packet during the first time interval.

9. The method of claim 8 wherein
the RTS packet includes one of a broadcast packet and a point-to-point packet, and the CTS packet includes one of a point-to-point packet and a singular packet.

10. The method of claim 1 wherein the first time interval includes an integer value of time slots greater than another integer value of time slots of the contention interval.

11. A node communicating on a channel in a network using a carrier sense multiple access (CSMA) protocol and accessing the channel by occupying at least one time slot in a contention interval, comprising:
a transceiver for transmitting and receiving messages on the channel,
a counter, coupled to the transceiver, for counting the messages transmitted and received by the transceiver and providing output count values, and
a controller, coupled to the counter, for (a) receiving the count values, (b) determining a channel occupancy based on the count values, and (c) adaptively adjusting the contention interval based on the channel occupancy;
wherein the controller adaptively adjusts the contention interval, designated by S and having a predetermined maximum value of Smax, according to the following expressions:

$S=\min(S+S_{up}, S_{max})$ $S=\max(S-S_{down}, 1)$ wherein Sup is a first integer value and Sdown is a second integer value.

12. The node of claim 11 including a media access controller (MAC) coupled to the controller for (a) receiving the adjusted contention interval and (b) reserving the channel, during the adjusted contention interval, based on a randomly generated number.

13. The node of claim 11 wherein the output count values include
a value for clear to send (CTS) packets received and transmitted by the transceiver during a first time interval, and
a value for request to send (RTS) packets received and transmitted by the transceiver during the first time interval.

14. The node of claim 13 wherein
the value for CTS packets includes at least one of a value for singular CTS packets and a value for point-to-point CTS packets, and
the value for RTS packets includes at least one of a value for broadcast RTS packets and a value for point-to-point RTS packets.

15. The node of claim 11 wherein the controller determines channel occupancy during a first time interval and adaptively adjusts the contention interval during a second time interval.

16. A machine-readable storage medium including a set of instructions for implementing a method of reducing data collision on a communications channel accessed by occupying at least one time slot in a contention interval, using a carrier sense multiple access (CSMA) protocol, the method including the steps of:
(a) counting transmitted and received messages on the channel during a first time interval;
(b) determining a channel occupancy during the first time interval based on the counting in step (a); and
(c) adaptively adjusting the contention interval based on the determined channel occupancy in step (b);
wherein step (C) includes adaptively adjusting the contention interval, designated by S and having a predetermined maximum value of Smax, according to the following expressions:

$S=\min(S+S_{up}, S_{max})$ $S=\max(S-S_{down}, 1)$ wherein Sup is a first integer value and Sdown is a second integer value.

17. The machine-readable storage medium of claim 16 wherein
step (b) includes estimating probability of successful transmission of a message on the channel during a second time interval, the second time interval following the first time interval, and
step (c) includes adaptively adjusting the contention interval for the second time interval.

18. The machine-readable storage medium of claim 17 wherein the first time interval is substantially similar to the second time interval.

19. The machine-readable storage medium of claim 16 wherein
step (c) includes increasing the contention interval by a first number of time slots, if the channel occupancy is higher than a first predetermined value, and
decreasing the contention interval by a second number of time slots, if the channel occupancy is lower than a second predetermined value.

* * * * *